Nov. 22, 1938.    E. H. PIRON    2,137,543
JOURNAL BEARING ASSEMBLY
Filed May 23, 1935
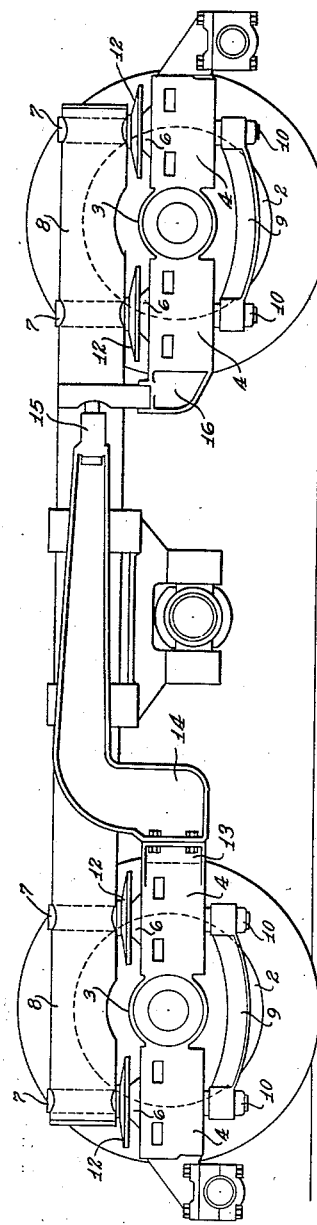
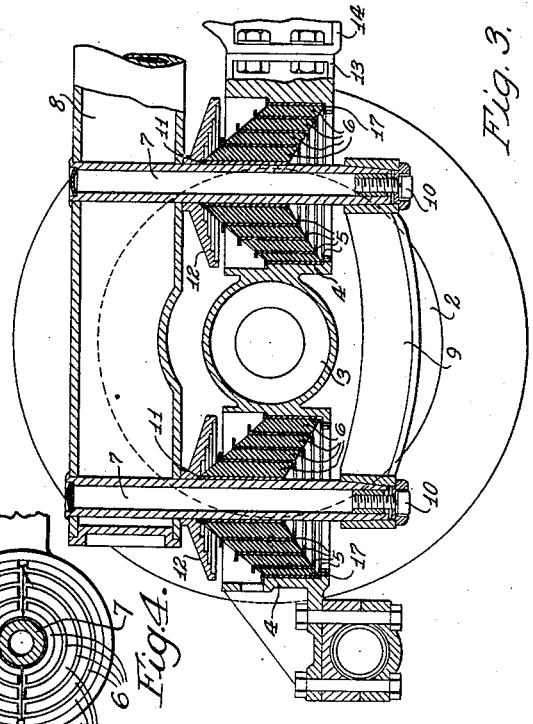
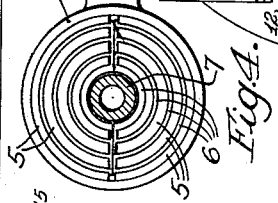
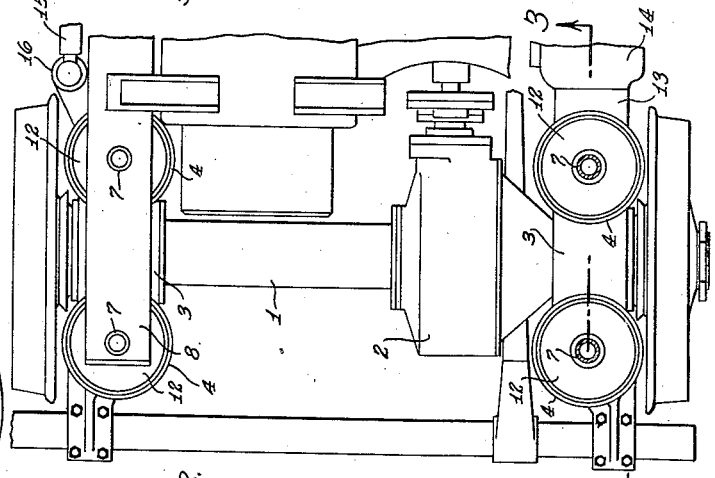
INVENTOR.
Emil H. Piron
BY
ATTORNEY.

Patented Nov. 22, 1938

2,137,543

UNITED STATES PATENT OFFICE 2,137,543

JOURNAL BEARING ASSEMBLY

Emil H. Piron, New York, N. Y., assignor, by mesne assignments, to Transit Research Corporation, New York, N. Y., a corporation of New York Application May 23, 1935, Serial No. 23,047

13 Claims. (Cl. 105—224.1)

This invention relates to rail trucks of the type revealed in my co-pending application Serial Number 24,190, filed May 31, 1935, and more particularly to the journal bearing assemblies thereof.

The journal bearing assembly as shown herein comprises essentially a journal bearing and housing therefor and journal springs with retainers therefor together with the load imposing and load receiving constructions associated therewith. An object of this invention is to provide an improved assembly by employing the type of spring described in my Patent No. 2,069,270, granted February 2, 1937, with one spring fore and one spring aft of each journal bearing.

Another object is to provide an integral structural unit including a journal bearing housing and retaining means for each of the two journal springs, the unit then being adaptable to be fixedly secured to an axle housing and to a torque arm as more fully described in the above mentioned application.

Another object is to provide a frame construction such that the journal springs and journal bearings may be readily detached and removed therefrom without removing any other major part, it being highly desirable to so construct the truck that a complete axle assembly is removable therefrom upon jacking up the end of the frame to which it is secured.

Other objects and advantages will become hereinafter more fully apparent as reference is had to the accompanying drawing wherein my invention is illustrated and in which Figure 1 is a side elevation of a rail truck constructed in accord with my invention;

Figure 2 is a top elevation of one end of the truck of Figure 1;

Figure 3 is a vertical section taken axially through the springs of a journal bearing assembly, and Figure 4 is a plan view of one main journal spring.

More particularly, I designates an axle housing having a gear case 2 integral therewith. At each end of the axle housing I are rigidly secured journal bearing housings 3, one of the housings 3 being rigidly secured, as by bolting, to the gear case 2 while the other is rigidly secured directly to the housing I.

Integral with each housing 3 are two cylindrical retainers 4, one fore and one aft of the journal bearing. These retainers 4 each receive alternate cylindrical layers 5 of metal or equivalent material and rubber or equivalent material 6 which constitute journal springs, the retainers 4 normally being the static load receiving members. Axially through the spring 5, 6 is a cylindrical shaft 7 which is normally the load imposing member. All members 4 and 7 are preferably vertical and hence parallel. The members 7 are fixedly secured to the main side rails 8 of the truck frame at their top ends and the lower ends, which extend well through the springs 5, 6 may be tied together by a strap 9 to improve the rigidity of the assembly. The strap 9 is readily removable by removal of some retaining means such as the screws 10. It will be noted that the innermost layer of each spring is of metal. All of said layers are made up of segments or semi-cylinders, as illustrated in Figure 4 and as more fully set forth in my aforementioned Patent No. 2,069,270, and are maintained in assembled relation simply by the pressure imposed by the retainers 4. The segments of any metallic cylinders total less than 360° whereby compression of the rubber is possible. The innermost metallic cylinder 5 fits into a recess 11 in a stop plate 12 and this plate is inserted freely onto a shaft 7, finding abutment against a frame girder 8. The stop plates 12 are equipped with steps to constitute means for progressively limiting the possible deflection of the cylinders of rubber to their predetermined maximum, the rubber subjected to the greatest unit shear loading being taken out of action first, and so on.

Integral with one retainer 4 is a flange or bracket member 13 for rigid attachment to an arm 14 secured through a universal joint means 15 or the equivalent to an arm 16 rigidly secured to a retainer 4 of another journal bearing assembly of another axle. In Figure 1 the arm 14 is illustrated as being the longer one whereas the reverse will be true on the opposite side of the frame, as set forth in my aforementioned co-pending application Serial No. 24,190. The connecting arms 13, 14, 15, 16 together with the housings 3 and retainers 4 constitute torque resisting means for the axle housings 1.

The retainers 4 are each provided with openings or notches 17 for insertion of a tool so that upon jacking up the frame comprising girders 8 each spring 5, 6 may be forced out of its retainer whereupon the segments fall from the main members 7.

What I claim is:

1. Journal springs for a rail truck comprising cylindrical masses of rubber with their axes vertical and parallel, stiff cylindrical retainers for said masses, means for fixedly securing said retainers together, vertical means extending through the center of each of said cylinders of rubber in surface engagement therewith to impose a shear loading thereon, and means rigidly connecting said vertical means together above and below said masses of rubber.

2. In a journal bearing assembly for a rail truck, journal springs comprising cylindrical masses of rubber with their axes vertical and parallel, stiff cylindrical retainers for said masses adapted to maintain substantial radial compression thereon, means comprising a journal bearing housing integrally secured to both of said retainers, and load imposing means extending axially through each of said cylinders of rubber in operative engagement therewith and adapted to impose shear loading thereon, said retainers constituting load receiving means and the masses of rubber resisting all relative movements between the load imposing and the load receiving means.

3. In a journal bearing assembly for a rail truck, journal springs composed of two springs each comprising concentric load imposing and load receiving members having alternate mutually surface-bonded cylinders of stiff and elastic material therebetween, said springs being laterally spaced to receive a journal bearing housing therebetween, said housing being rigidly secured to both of said load receiving members, said elastic material being adapted to transmit all forces between said load imposing and said load receiving members.

4. In a journal bearing assembly for a rail truck, journal springs composed of two springs each comprising concentric load imposing and load receiving members having alternate mutually surface-bonded cylinders of stiff and elastic material therebetween, said springs each having upper and lower surfaces of substantially conical shape, said springs being laterally spaced to receive a journal bearing housing therebetween, said housing being rigidly secured to both of said load receiving members, said elastic material being adapted to transmit all forces between said load imposing and said load receiving members.

5. In a journal bearing assembly for a rail truck, journal springs composed of two springs each comprising concentric load imposing and load receiving members having alternate mutually surface-bonded cylinders of stiff and elastic material therebetween, the stiff cylinders each being composed of segments which when assembled form less than 360° whereby the abutting edges thereof are spaced from each other, and spring housings being adapted to receive their respective springs and to maintain said elastic material under substantial radial compression, said springs being parallel and in spaced relation to receive a journal bearing therebetween.

6. In a rail truck, a journal bearing housing, journal springs one fore and one aft of said housing, each of said springs comprising concentric load imposing and load receiving members having an elastic material therebetween through which all driving and retarding and vertical forces are transmitted, said load receiving members each being rigidly secured to said housing in parallel relation, said load imposing members extending substantially through said elastic material, and spaced means for securing said load imposing members together to maintain a parallel relation therebetween, said spaced means having the journal springs between them.

7. In a rail truck, a journal bearing housing, journal springs one fore and one aft of said housing, each of said springs comprising concentric load imposing and load receiving members having an elastic material therebetween through which all driving and retarding and vertical forces are transmitted, said load receiving members each being rigidly secured to said housing in parallel relation with each other, and a truck frame supported by said springs and horizontally immovable with respect to both of said load imposing members.

8. In a rail truck the combination of journal bearing housings, journal spring retainers integral with said housings, one of said retainers being fore and one aft of each of said housings, journal springs comprising alternate mutually surface-bonded cylindrical concentric vertical layers of stiff and elastic material and including a central stiff layer in surface contact with the inner one of said elastic layers and constituting a load imposing member, and a stepped stop plate above each of said springs for limiting the possible deflection of each of said layers of elastic material, said stop plates being placed to receive at least a part of the load to be applied to said springs and having their steps above said stiff layers.

9. An axle journal bearing assembly comprising an axle journal bearing, a housing for said bearing, vertical cylindrical journal springs of elastic material one at one side of and the other at the other side of said housing and having their peripheries secured thereto, cylindrical load imposing means secured to the centers of said springs, shafts extending through said load imposing means, and means above and below said housing and said springs for connecting said shafts to each other.

10. In a rail car, an axle, journal bearings for said axle, means for transmitting the weight of the car to said journal bearings including rubber in vertical cylindrical form and connecting means for imposing the weight of the car on said rubber and for transmitting the weight of the car from said rubber to said bearings, said rubber carrying said weight in vertical shear and being under radial compression to effectively transmit horizontal accelerational and decelerational forces to said bearings and said axle.

11. In a vehicle, journal bearing assembly comprising an axle journal bearing, a housing for said bearing, journal springs one fore and one aft of said housing and its axle through which all driving and retarding forces are transmitted chiefly by compression of the material of said springs, and a supporting structure for both of said springs rigidly secured to said housing for movement in unison therewith.

12. A journal bearing assembly comprising a journal bearing, a housing for said bearing, journal springs one fore and one aft of said housing through which all driving and retarding forces are transmitted chiefly by compression of the material of said springs, metallic cylinders one fore and one aft of said bearing, each of said cylinders having an inturned flange as a supporting means for said springs, said cylinders having their axes parallel to each other and normal to the axis of said housing.

13. In a rail truck, a journal bearing housing, journal springs one fore and one aft of said housing, each of said springs comprising concentric load imposing and load receiving members having an elastic material therebetween, said load receiving members and said load imposing members all being parallel to each other, means for supporting said load receiving members on said housing and preventing lateral motion of said members relative to said housing, a truck frame above said springs and supported by said load imposing members, means forming extensions of said load imposing members, said means being secured to said frame above said load imposing members and extending below said load receiving members, and a rigid strap connecting the bottom ends of said extension means to maintain said load imposing members in parallel relation.

EMIL H. PIRON.